Feb. 27, 1962 P. G. HANSEL 3,023,410
MONITOR FOR DOPPLER BEACON SYSTEM
Filed Dec. 23, 1959
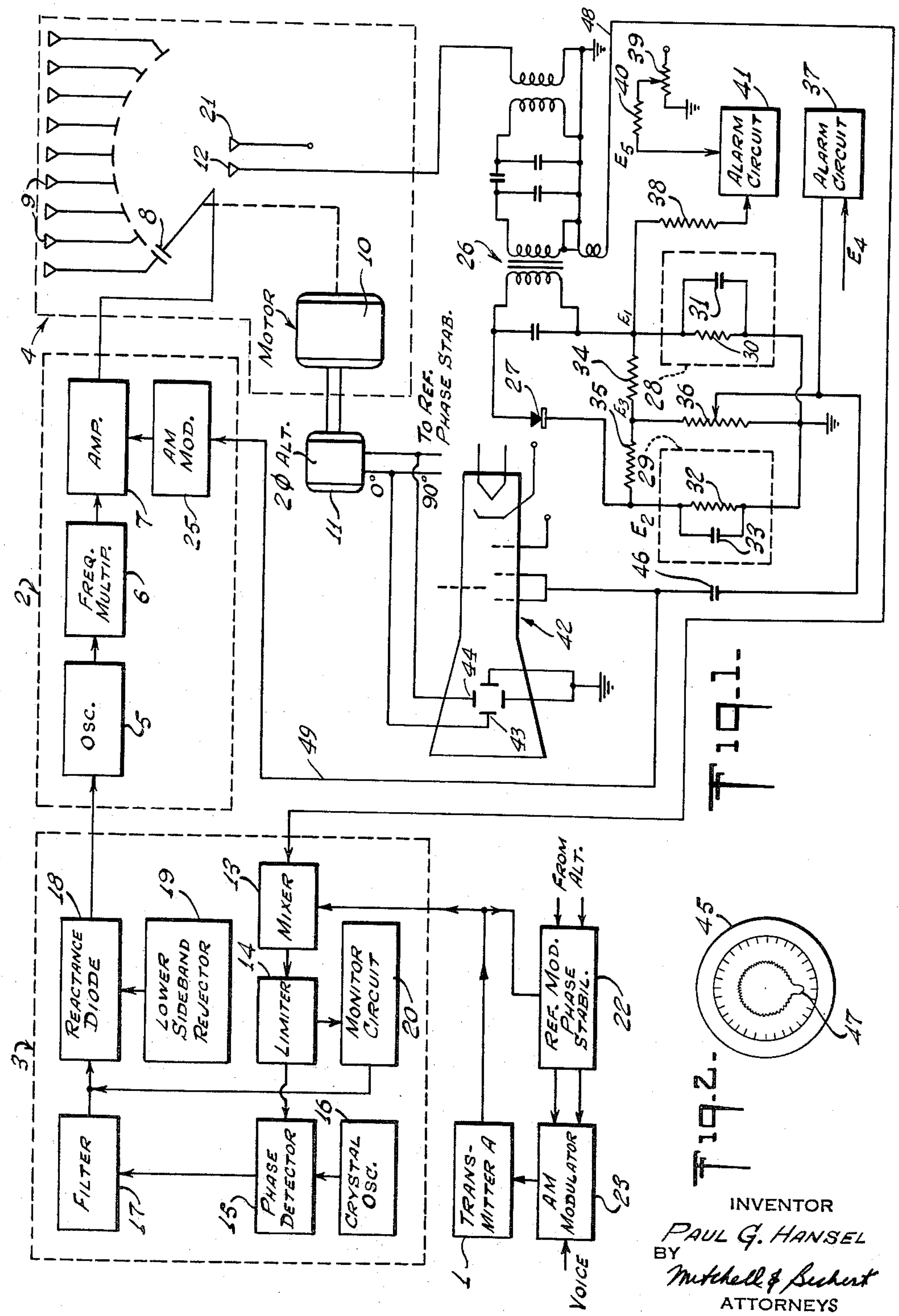
INVENTOR
PAUL G. HANSEL
BY Mitchell & Bechert
ATTORNEYS United States Patent Office 3,023,410

Patented Feb. 27, 1962

3,023,410

MONITOR FOR DOPPLER BEACON SYSTEM

Paul G. Hassel, Greenvale, N.Y., assignor to Servo Corporation of America, Hicksville, N.Y., a corporation of New York Filed Dec. 23, 1959, Ser. No. 861,551
5 Claims. (Cl. 343—106)

This invention relates to Doppler radio beacon systems and more particularly to a monitor for a commutated antenna system of a Doppler radio navigation beacon.

Some electronic information systems, such as Doppler omnirange navigation aids, successively couple a source of signal energy to a plurality of radiating elements disposed in a ring or circle, in order to simulate closely the radiation pattern of the ideal radiator, a whirling antenna. For example, in one type of Doppler omnirange beacon, a reference signal is generated at a given frequency and a comparison signal is generated at a constant frequency-difference from the reference signal. The comparison signal is effectively rotated by successively coupling it through a commutator to a plurality of radiating elements, disposed in a ring about the reference signal radiator. A measurement at a remote location of the Doppler frequency of the effectively rotated signal relative to the reference signal provides an indication of the azimuth of the remote location relative to the signal sources.

It is usual in omnirange beacon systems to locate a monitor receiver at a point distant from the transmitting antenna system to provide an indication of the proper functioning of the radio beacon. Since the standard conventional monitor is situated at a fixed position or radial relative to the beacon antenna system, it provides an indication of the course position and the course width along a particular radial. However, a failure of one or more of the commutated antenna elements could cause a change of course position along some other radial without throwing the standard monitor's radial out of tolerance. In addition, certain types of trouble can be introduced which would affect only some radials on which the standard monitor is not located, if the frequency control of the two transmitters should fail to maintain the constant frequency difference.

One of the objects of this invention, therefore, is to provide a monitor for the commutated antenna system of a Doppler radio beacon.

Another object of this invention is to provide a monitor capable of detecting the malfunctioning of a single radiating element in a successively commutated ring of antennas.

A further object of this invention is to provide a monitor for a commutated antenna system capable of identifying a single malfunctioning element or failure in the transmitter distributor or coupling equipment.

One of the features of this invention is the provision of a monitor antenna, centrally disposed relative to an antenna system having a ring of radiating elements, successively commutated. The signals received by the centrally disposed monitor antenna are rectified and coupled to one load circuit having a long time constant and to another load circuit having a short time constant. The load circuit having a long time constant develops a signal indicative of departures from a predetermined average radiated power while the load circuit having a short time constant develops a signal indicative of the malfunctioning of a single radiating element.

Another feature of this invention is the provision of a cathode ray indicator responsive to the signals received on a centrally disposed monitor antenna to facilitate the identification of a malfunctioning radiating element in a ring of commutated antennas.

The above mentioned and other objects and features of this invention will become more apparent by reference to the following description taken in conjunction with the accompanying drawing, in which:

FIG. 1 is a circuit diagram partly in block form of Doppler omnirange navigation system, using the antenna system monitor of this invention; and, FIG. 2 is an illustration of the representation on the face of the cathode ray indicator of the monitor of this invention.

Referring to FIG. 1 of the drawing, a Doppler omnirange radio navigation beacon system is therein shown to comprise a master signal source 1, transmitter "A," a slaved signal source 2, transmitter "B," a phase locked servo control loop 3 which adjusts the frequency of the output of signal source 2 to maintain a constant offset frequency or frequency difference in its output relative to the frequency of the signal output of source 1, and an antenna system 4 for radiating the output of the signal sources 1 and 2.

The signal source 2 includes an oscillator 5 which has its output coupled to a frequency multiplier 6. The output of the frequency multiplier 6 is coupled through amplifier 7 to the commutator 8 of the antenna system 4. The commutator 8 successively couples the energy from signal source 2 to a plurality of radiating elements 9, disposed in a ring or circle about a central point. In order successively to couple energy to each of the radiating elements 9 in the ring, the commutator 8 is mechanically rotated by a motor 10, which also drives a two phase alternator 11. The radiation pattern of the successively energized elements 9 which are disposed in a ring closely simulates the pattern of a whirling antenna.

A monitor antenna 12 is disposed in the center of the ring or circle of radiating elements 9 and receives the signals emitted therefrom. The signals received by the monitor antenna 12 are coupled to the mixer circuit 13 in the phase locked servo control loop circuit 3. The other input to the mixer 13 is coupled from the signal source 1. The output of the mixer 13 is limited in circuit 14 and coupled as one input to the phase detector 15. The other input to the phase detector 15 is the output of a crystal controlled oscillator 16 which produces a signal having a frequency equal to the desired frequency separation between the signal sources 1 and 2.

The output of the phase detector 15 is responsive to any difference in frequency or phase of the signals radiated from the antenna elements 9, the output of source 1 and the output of the crystal oscillator 16. The output of the phase detector 15 is filtered in circuit 17 and utilized as an input to a reactance device such as a diode 18. In accordance with well known engineering principles, the output of the reactance device 18 is coupled to the oscillator 5 of the signal source 2 to adjust the frequency of its output. In order to assure that the oscillator 5 will operate at the proper sideband, a sideband rejector circuit 19 is provided. Monitor circuits 20 in the phase locked servo loop circuit 3 provide an indication of the malfunctioning of any component in the radio system.

The master signal source 1, transmitter "A," has its output coupled to a reference antenna 21 also located centrally of the antenna ring 9. In order to phase stabilize the reference signal output from source 1, a reference modulation phase stabilizer 22 is provided, having as one input, the signal from the source 1 and as the other input a pair of signals ninety degrees out of phase and having a frequency equal to the rate of rotation of the commutator 8. This last mentioned pair of signals is obtained as an output from the two phase alternator 11 which is driven by the commutator motor 10. The stabilizer circuit 22 has tis output coupled through the modulator 23 to the signal source 1. The modulator 23 may also be used to impress voice or other information bearing signals as a modulation of the reference signals radiated from the reference antenna 21.

In order to detect the malfunctioning of the antenna system of the Doppler beacon, a special monitor circuit, elements 26–41, is provided. The Doppler monitor circuit 24 couples the signals received by the centrally located monitor antenna 12, through simple tuned circuits 26, to a rectifier 27. The rectifier 27 has two load circuits 28 and 29. The first load circuit 28 comprises a resistance 30 and capacitance 31. A negative voltage is developed across load circuit 28. The second load circuit 29 comprises a resistance 32 and a capacitance 33, across which a positive voltage is developed. The negative voltage developed across the first load circuit 28 is designated $E_1$ and the positive voltage developed across the second load circuit 29 is designated $E_2$.

The combination of resistance 30 and capacitance 31 in the first load circuit 28 provides a time constant which is long compared to the scanning time of the commutator 8. Therefore, $E_1$ is proportional to the average signal level radiated by all of the elements 9 in the commutated antenna ring.

The average value of signal strength, $E_1$, developed across the long time constant load circuit 28, is coupled through a resistance 38 and compared with a biasing voltage $E_5$ derived from the potentiometer 39 and coupled through resistance 40. The result of the comparison of $E_1$ and $E_5$ is applied to an average power alarm circuit 41 which is actuated in the event the average power $E_1$ from the commutated antenna ring 9 departs from preset tolerances as determined by the value $E_5$. Thus, the average power alarm circuit 41 is actuated in the event of transmitter failure or a malfunctioning of the distributor or interconnecting cables.

The combination of resistance 32 and capacitance 33 in the second load circuit 29 is designed to provide a short time constant relative to the scanning period of the commutator 8, and therefore, $E_2$ is proportional to the instantaneous value of the radiated power. The voltage difference between the instantaneous $E_2$ and the average $E_1$ radiated power values, which is designated $E_3$, appears across the junction of resistances 34 and 35. The difference voltage $E_3$ fluctuates throughout the commutation cycle in accordance with the power radiated by the individual elements 9 in the commutated antenna ring. A portion of the difference voltage $E_3$ is derived from the potentiometer 36 and is utilized to establish the "normal" relationship between the voltages $E_1$ and $E_2$. The "normal" voltage ratio between the average and instantaneous values is coupled as one input to the defective radiating element alarm circuit 37 where it is compared with a "standard" voltage $E_4$ and any variation from the "standard" by the normal voltage signal triggers the alarm circuit 37 yielding an indication that one of the radiating elements 9 in the antenna ring is defective. Thus, if any single element 9, or if any equipment associated with a single radiating element only is defective alarm 37 is actuated.

In addition to knowing that a single element 9 is defective, it is desirable to identify the particular defective element so that corrective action may be taken. Identification of the defective radiating element is accomplished by utilizing a cathode ray tube indicator 42. The deflection plates 43 and 44 of the cathode ray tube indicator 42 are coupled to a two phase time base signal derived from the windings of the two phase alternator 11, which is driven with the commutator 8 via motor 10. The ninety degree out of phase signals from the alternator 11 have a frequency equal to the scanning rate of the commutator 8 and when applied to the deflection plates 43 and 44 produces a circular pattern on the screen 45 of the tube 42. The scanning rate of the tube 42 is equal to the scanning rate of the commutator 8. The screen 45 of the tube 42 is provided with a scale identifying the radiating elements 9 in the antenna ring. In order to provide radial control the "normal" voltage signal is applied through a capacitor 46 to the accelerating electrode of the cathode ray tube 42. When a radiating element 9 is defective, the "normal" voltage signal becomes more negative and momentarily increases the deflection sensitivity of the cathode ray tube 42, producing a radial "blip" 47 as shown in FIG. 2 of the drawing. Comparison of the radial "blip" 47 with the scale on the screen of the tube 42 identifies the defective radiating element. The increase in the deflection sensitivity of the tube 42 occurs because, as a defective element 9 is scanned, the average negative voltage $E_1$ remains constant whereas the positive voltage $E_2$ decreases momentarily. This causes the normal voltage signal to become negative and the application of this negative pulse to the accelerating electrode of the cathode ray tube 42 reduces the effective positive accelerating voltage and momentarily increases deflection sensitivity.

In addition, a phase-lock reference signal is inductively derived from the monitor antenna 12 and coupled over line 48 to the mixer 13. Deriving the phase reference at this point enables the phase lock servo loop 3 to compensate for the inevitable phase modulation that is produced by the commutator 8. Moreover, a feedback signal is coupled over line 49 to the modulator 25 of signal source 2 to compensate for and eliminate, due to the inverse feedback, the objectionable amplitude modulations of the signals radiated by the elements 9.

A standard omnirange monitor (not shown) may be located at a distance from the beacon along a radial in order to perform the usual monitor functions.

Thus, a monitor for a commutated antenna system is provided which can detect malfunctioning of the system, or of a single radiating element and identify the element.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A monitor for a commutated antenna system having a plurality of radiating elements to which a source of signals is successively coupled during a scanning period comprising means to detect the average power radiated by said elements during said scanning period, means to develop a signal responsive to said detected average power, a bias signal source, means to compare said developed average power signal and said bias signal and alarm means responsive to said comparison.

2. A monitor for a commutated antenna system having a plurality of radiating elements to which a source of signals is successively coupled during a scanning period comprising means to detect the average power radiated by said elements during said scanning period, means to develop a first signal responsive to said detected average power, means to detect the instantaneous power successively radiated by each of said elements, means to develop a second signal responsive to said instantaneous radiated power, means to develop a third signal responsive to the difference between said first and second signals, means to compare said third signal to a predetermined norm and alarm means responsive to said comparison.

3. A monitor according to claim 2 which further includes a bias signal source, means to compare said first signal to said bias signal and indicator means responsive to said last mentioned comparison.

4. A monitor for an antenna system having a plurality of radiating elements disposed in a ring, a commutator for successively coupling a source of signals to said radiating elements and means for rotating said commutating means comprising means to detect the instantaneous power successively radiated by each of said elements, means to develop a signal responsive to said detected instantaneous power, a cathode ray tube, means for generating a pattern signal responsive to said means for rotating said commutator, means for coupling said pattern signal to said cathode ray tube to cause a pattern on the screen thereof, and means coupling the difference between said instantaneous power signal and the average power signal to said cathode ray tube to deflect said pattern responsive to the instantaneous power radiated by said elements.

5. In combination with an antenna system having a plurality of radiating elements disposed in a ring to which a source of signals is successively commutated; a monitor antenna disposed centrally of said ring, means to detect the average power received by said monitor antenna, means to detect the instantaneous power received by said monitor antenna, means to develop a first signal responsive to the difference between said average power and said instantaneous power, first alarm means responsive to said first signal, and second alarm means responsive to said average power detected.

No references cited.